US010241653B2

(12) United States Patent
Chai et al.

(10) Patent No.: US 10,241,653 B2
(45) Date of Patent: Mar. 26, 2019

(54) METHOD FOR DELETING MESSAGES AND TERMINAL

(71) Applicant: JRD COMMUNICATION INC., Shenzhen, Guangdong (CN)

(72) Inventors: Feifei Chai, Shenzhen (CN); Jianqiang Chen, Shenzhen (CN)

(73) Assignee: JRD COMMUNICATION INC., Shenzhen, Guangdong (CN)

( * ) Notice: Subject to any disclaimer, the term of this patent is extended or adjusted under 35 U.S.C. 154(b) by 573 days.

(21) Appl. No.: 14/906,456

(22) PCT Filed: May 6, 2015

(86) PCT No.: PCT/CN2015/078402
§ 371 (c)(1),
(2) Date: Jan. 20, 2016

(87) PCT Pub. No.: WO2016/086592
PCT Pub. Date: Jun. 9, 2016

(65) Prior Publication Data
US 2016/0320933 A1 Nov. 3, 2016

(30) Foreign Application Priority Data

Dec. 20, 2014 (CN) .......................... 2014 1 0716227

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 3/0418* (2013.01); *G06F 3/0481* (2013.01);
(Continued)

(58) Field of Classification Search
CPC .... G06F 3/0484; G06F 3/0418; G06F 3/0481; G06F 3/04883; G06F 17/24
(Continued)

(56) References Cited

U.S. PATENT DOCUMENTS

RE43,448 E * 6/2012 Kimoto ................ G03G 15/502
399/81
8,654,091 B2 * 2/2014 Kim .................. H04M 1/72577
345/173
(Continued)

FOREIGN PATENT DOCUMENTS

CN 103543903 A 1/2014
CN 103645625 A 3/2014
(Continued)

*Primary Examiner* — David Phantana-angkool
(74) *Attorney, Agent, or Firm* — Ladas & Parry LLP

(57) ABSTRACT

The present invention proposes a method for deleting messages and a related terminal. The method includes: A: recording a sliding path of a user on a terminal and mapping the sliding path as a message deleting command; B: defining a margin of error based on the sliding path; C: popping up a message prompt box when a new message is detected and must be displayed, whether the screen is locked or the terminal is being used; D: examining the sliding path of users on the screen and deciding whether it is in line with the pre-defined deleting path; and E: deleting the message directly when the sliding path is in line with the pre-defined deleting path. As such, users can immediately delete spam messages when a message is received, even if the screen is locked. The method is easy to use and provide significant convenience to users.

12 Claims, 3 Drawing Sheets

(51) Int. Cl.
 *G06F 3/0481* (2013.01)
 *G06F 3/0488* (2013.01)
 *G06F 17/24* (2006.01)
 *H04L 12/58* (2006.01)
 *G06F 3/041* (2006.01)
(52) U.S. Cl.
 CPC .......... *G06F 3/04883* (2013.01); *G06F 17/24* (2013.01); *H04L 51/12* (2013.01); *H04L 51/22* (2013.01); *H04L 51/24* (2013.01)
(58) Field of Classification Search
 USPC ........................................................ 715/753
 See application file for complete search history.

(56) References Cited

U.S. PATENT DOCUMENTS

| | | | | |
|---|---|---|---|---|
| 8,698,845 | B2* | 4/2014 | Lemay | G06F 3/0488 345/158 |
| 8,854,318 | B2* | 10/2014 | Borovsky | G06F 3/04883 345/173 |
| 9,032,337 | B2* | 5/2015 | Oh | G06F 3/04883 715/863 |
| 9,423,952 | B2* | 8/2016 | Tamegai | G06F 3/0412 |
| 9,632,651 | B2* | 4/2017 | Kim | G06F 3/0481 |
| 9,996,231 | B2* | 6/2018 | Missig | G06F 3/04842 |
| 2006/0004914 | A1* | 1/2006 | Kelly | G06Q 30/00 709/219 |
| 2007/0150842 | A1* | 6/2007 | Chaudhri | G06F 3/04883 715/863 |
| 2010/0205538 | A1* | 8/2010 | Han | G06F 3/0482 715/752 |
| 2010/0262928 | A1* | 10/2010 | Abbott | G06F 3/04817 715/769 |
| 2012/0053887 | A1* | 3/2012 | Nurmi | G06F 3/0485 702/150 |
| 2012/0209926 | A1* | 8/2012 | Backholm | G06Q 50/01 709/206 |
| 2014/0240247 | A1* | 8/2014 | Jin | G09G 5/37 345/173 |
| 2014/0344923 | A1* | 11/2014 | Wang | G06F 21/36 726/19 |
| 2015/0120554 | A1* | 4/2015 | Guan | G06F 3/04842 705/44 |
| 2015/0121312 | A1* | 4/2015 | Li | G06F 3/04817 715/847 |
| 2015/0264169 | A1* | 9/2015 | Yim | H04M 1/72563 455/411 |
| 2016/0026219 | A1* | 1/2016 | Kim | H04M 1/0245 345/173 |
| 2018/0213358 | A1* | 7/2018 | Shen | G01C 21/20 |

FOREIGN PATENT DOCUMENTS

| | | |
|---|---|---|
| CN | 103699327 A | 4/2014 |
| CN | 104580691 A | 4/2015 |

* cited by examiner

METHOD FOR DELETING MESSAGES AND TERMINAL

CROSS REFERENCE TO RELATED APPLICATION

This application claims the priority of International Application No. PCT/CN2015/078402, filed on May 6, 2015, which claims priority to Chinese Application No. 201410716227.6, filed on Dec. 2, 2014. The entire disclosures of each of the above applications are incorporated herein by reference.

BACKGROUND OF THE INVENTION

1. Field of the Invention

The present invention relates to terminal technology, and more specifically, to a method for deleting messages and a terminal.

2. Description of the Prior Art

When existing terminals with screens locked are displaying messages, some terminals require the screen to be unlocked before message prompt box can be displayed. Users can browse, reply, or delete the message in the prompt box, or exit the prompt box. When messages are obviously spams, such as advertisements, or harassing or useless messages, users still must unlock the screen before accessing the message interface instead of deleting spams directly.

Although some terminals do not require the screen to be unlocked first, as shown in FIG. 1, the prompt box can only display part of the message content; operations such as reply, delete or exit are not allowed. Users must click on the prompt box or unlock the screen by sliding across area 2 to enter the message app menu to read full content of the message and undertake other operations. They cannot delete the message directly.

The abovementioned display method, although based on the idea of information security provided by the locked screen, causes inconvenience for users as they cannot directly delete messages that are obviously spams but have to undertake other operations before they can delete the message.

If a message prompt box is shown when a terminal is being used, users can choose to delete it by pressing on the delete button. However, in some cases, users may choose a wrong button and fail to delete the message, or some terminals require users to confirm again whether they would like to delete the message after they have chosen to delete. If the message is a spam, this confirmation step prevents users from deleting the message directly, which is a waste of users' time.

Therefore, the existing technology needs to be improved.

SUMMARY OF THE INVENTION

Given the insufficiency of the existing technology as described above, one object of the present invention is to provide a method for deleting messages and a terminal, so to solve the problem with existing terminals that cannot delete messages directly.

According to the present invention, a method for deleting messages comprises:

step A: popping up a message prompt box when a new message is detected and must be displayed, whether the screen is locked or the terminal is being used;

step B: examining the sliding path of users on the screen and deciding whether it is in line with the pre-defined deleting path; and step C: deleting the message directly when the sliding path is in line with the pre-defined deleting path.

Furthermore, before the step A, the method further comprises:

step A01: recording a sliding path of a user on a terminal and mapping the sliding path as a message deleting command; and step A02: defining a margin of error based on the sliding path.

Furthermore, the shape of the sliding path comprises square, circle and line, which comprises straight lines, tilted lines and curved lines. Defining the margin of error comprises defining the direction, length, and position on the screen of a linear sliding path, and the size and position on the screen of a square/circle sliding path.

Furthermore, the margin of error comprises a length L of the actual sliding path, with L meeting the criteria $L1 \leq L \leq L2$; a height H, with H meeting the criteria $H1 \leq H \leq H2$, where L1 is a first length, L2 is a second length, H1 is a first height and H2 is a second height.

Furthermore, step B comprises:

step B01: extracting and storing coordinates of all points on the sliding path and the four vertexes of the message prompt box;

step B02: deciding whether coordinates of all points are within the message prompt box; confirming the sliding path is in line with the pre-defined deleting path if yes.

Furthermore, the sliding path is a line and step B comprises:

step B1: examining the sliding path of users on the screen, and extracting and storing coordinates of the start point and end point of the sliding path and the four vertexes of the message prompt box;

step B2: deciding whether the sliding direction of the sliding path is the same as that of the pre-defined slide based on the abscissas of the start point and end point, and coordinates of the four vertexes of the message prompt box; step B3 is executed if yes; a reminder of delete failure is provided if no;

step B3: deciding whether the length of the linear sliding path falls within the defined margin of error; step B4 is executed if yes; a reminder of delete failure is provided if no;

step: B4: deciding whether the height of the linear sliding path falls within the defined margin of error; the sliding path is in line with the pre-defined deleting path if yes; a reminder of delete failure is provided if no.

Furthermore, coordinates of the upper left corner, lower left corner, upper right corner, and lower right corner of the message prompt box are, respectively, (Xl, Yl), (Xu, Yu), (Xd, Yd) and (Xr, Yr); the coordinate of the start point of the sliding path is (Xa, Ya), and the coordinate of the end point of the sliding path is (Xb, Yb). Steps before step D3 further comprises calculating the first length, second length, first height, second height, and length and height of the actual sliding path based on the coordinates of the four vertexes of the message prompt box, with the lengths, heights and coordinates meeting the following criteria:

$$L=|Xa-Xb|;$$

$$L1=(2\times|Xr-Xl|)/3;$$

$L2=|Xr-Xl|;$ $H=|Ya-Yb|;$ $H1=0;$ $H2=|Yu-Yd|.$

Furthermore, the reminder of delete failure is a pop-up that blinks for a pre-defined period of time and then closes, and another sliding path on the screen or an operation to exit the message prompt box of users will be detected.

In contrast to prior art, the method for deleting messages and the terminal of the present invention, when detecting a new message that needs to be displayed, pops up a message prompt box regardless whether the screen is locked or the terminal is being used. Then, users' sliding path on the screen is examined to decide whether the sliding path is in line with a pre-defined deleting path. When the sliding path is in line with the pre-defined deleting path, the message is deleted directly. As such, users can immediately delete spam messages when a message is received, even if the screen is locked. The method is easy to use and provide significant convenience to users.

DETAILED DESCRIPTION OF THE PREFERRED EMBODIMENTS

The present invention provides a method for deleting messages and a terminal which mainly applies message deleting path when the screen is locked. The method can also apply when the phone is being used. When a message prompt box pops up on the screen of terminals, if users' sliding path on the screen is in line with the pre-defined deleting path, the message is deleted directly. In order to illustrate the technique and effects of the present invention, a detailed description will be disclosed by the following disclosure in conjunction with figures. It is noted that the same components are labeled by the same number.

Figure 1:
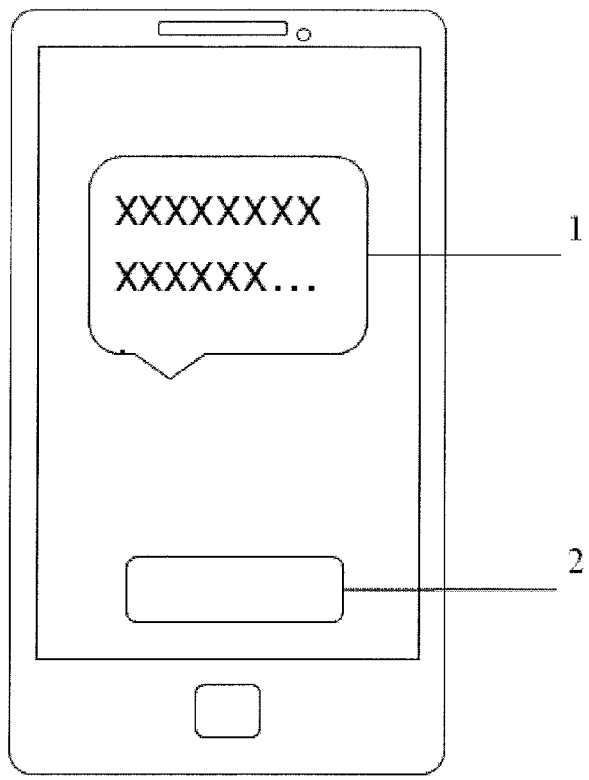
FIG. 1 shows a terminal showing a message.
Figure 2:
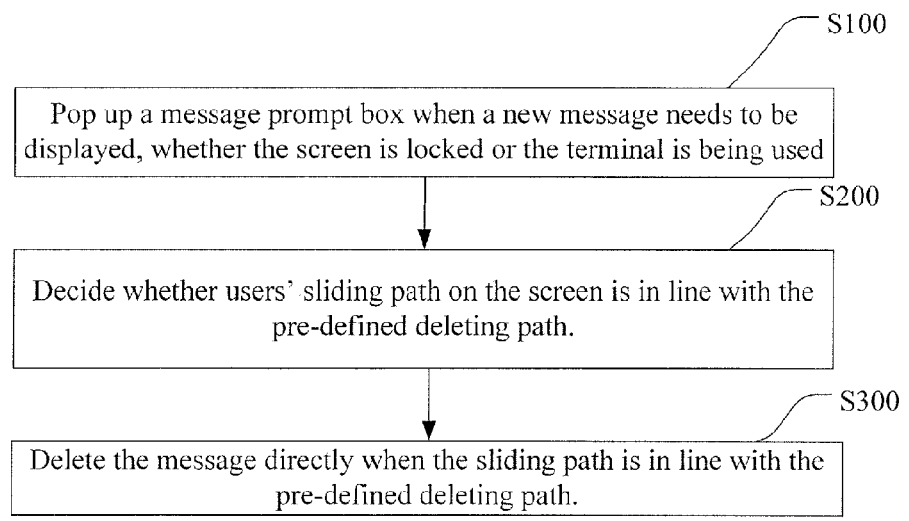
FIG. 2 shows a flowchart of a method of deleting a message according to a preferred embodiment of the present invention.

Please refer to FIG. 2. The method for deleting messages provided by the present invention comprises the following steps.

Step S100: pop up a message prompt box when a new message needs to be displayed, whether the screen is locked or the terminal is being used.

Step S200: decide whether users' sliding path on the screen is in line with the pre-defined deleting path.

Step S300: delete the message directly when the sliding path is in line with the pre-defined deleting path.

The present embodiment compares the actual sliding path of users with the pre-defined deleting path. If the sliding path fulfills criteria related to the deleting path, the message would be deleted directly. For this purpose, users need to define a deleting path before taking step S100. In other words, users must pre-define a set of mapping relations, which is a sliding path (mainly parameters of the coordinates comprising the sliding path) of users recorded by the terminal. Then the sliding path is mapped as a message deleting command.

Given that it is impossible to have identical sliding path every time, a margin of error must be defined based on the sliding path. If the path is a line, the margin of error can be defined according to the direction, length and position on the screen of the slide. If the path is a circle or square, then the margin of error can be defined according to the size of the circle or square. All sliding paths that fall within the margin of error are regarded as a deleting path and can execute message deleting command.

For the convenience of users to pre-define the deleting path and the purpose to simplify the process of verifying a sliding path, in practice, the deleting path is defined based on the message prompt box. Given that most message prompt boxes are square, sliding paths (such as a straight line, tilted line, triangle, square or circle) that slided from the box are defined as deleting paths. Therefore, the margin of error is related to the four vertexes of the message prompt box—the deleting path cannot exceed the message prompt box.

Generally, the upper left corner of a terminal screen is regarded as the origin (0,0), the width of the terminal being the x-axis and the length of the terminal being the y-axis. All coordinate values are positive. The further away from the origin, the larger the coordinate values are. Assume that the coordinates of the four vertexes of the message box are (Xl, Yl), (Xu, Yu), (Xd, Yd), (Xr, Yr), an actual sliding path would fall within the margin of error if its length L meets the criteria $L1 \le L \le L2$, and its height H meets the criteria $H1 \le H \le H2$.

In practice, L1 can be ⅔ of the width of the message prompt box, namely $(2\times|Xr-Xl|)/3$, or larger than 0 (e.g. 0.2). L2 is the width of the message prompt box, namely $|Xr-Xl|$. H1 can be ⅓ of the height of the message prompt box, namely $(1\times|Yu-Yd|)/3$, or larger than 0. H2 is the height of the message prompt box, namely $|Yu-Yd|$. This definition can ensure that sliding paths of a similar shape in any size within the message prompt box are regarded as deleting paths, thus lowers the difficulty of verifying the conformity of a sliding path.

Note that the abovementioned margin of error (namely L1, L2, H1 and H2), in practice, can be defined based on the size of the message prompt box and the habit of users. Users can also define sliding paths outside the message prompt box as deleting paths. No limit is imposed here. After the deleting path is defined, step S100 can be initiated.

When a new message is received by an existing terminal with its screen locked, some terminals require users to unlock the screen first to see the message prompt box. Other terminals, although do not require users to unlock the screen first, only show part of the message in the message prompt box with no operating keys. Therefore, in step S100, whether the screen is locked or the terminal is being used, a message prompt box pops up directly whenever the terminal detects a new message must be displayed. All or part of the message is shown in the message prompt box so that users, preferably, can read the message and clearly distinguish whether it is a spam. When users confirm that it is a spam, they can slide in a path similar to the pre-defined deleting path on the screen.

Throughout the process of sliding, //whether the sliding path is in square, circle or line (such as a straight line, tilted line or curved line), coordinates of all points on the sliding path and the four vertexes of the message prompt box must be extracted and stored to decide whether all the points on the sliding path are within the message prompt box. If yes, the sliding path is regarded as in line with the pre-defined deleting path. The message is deleted directly in step S300.

In the present embodiment, if the sliding path is a line, not all points on the path is recorded since it adds processing burdens to the terminal and is more time-consuming. Given that a line starts from one point and ends at another, step S200, more specifically, makes the decision only based on coordinates of the start point and end point so to simplify the process. In practice, step S200 comprises the following steps:

Step 1: examine the sliding path of users on the screen. Extract and store the coordinates of the start point (Xa, Ya) and end point (Xb, Yb) of the sliding path and the four vertexes of the message prompt box.

A linear slide is always directional. Therefore, whether the direction of the slide is the same as that of the pre-defined slide must be verified first when deciding whether a sliding path is in line with the pre-defined deleting path.

Step 2: decide whether the direction of the linear sliding path is the same as that of the pre-defined slide based on the abiscissas of the start and end points. If yes, step 3 would be taken. If no, users are reminded that the delete has failed.

If the direction of the pre-defined slide is from right to left, the abiscissa of the start point is larger then that of the end point, so the coordinates of the actual start and end points should meet critarias Xb<Xa, or Xb−Xa<0. If the direction of the pre-defined slide is from left to right, the abiscissa of the start point is smaller then that of the end point, so the coordinates of the actual start and end points should meet the critarias Xb>Xa, or Xb−Xa>0.

The next is to decide whether the length and height of the sliding path fall within the margin of error. The size of the message prompt box varies according to the amount of the message content. When defining the margin of error, the first thing to do is to calculate the first length, second length, first height, and second height based on the four vertexes of the present message prompt box, and the length and height of the actual sliding path.

The coordinates of the upper left corner, lower left corner, upper right corner and lower right corner of the message prompt box are, respectively, (Xl, Yl), (Xu, Yu), (Xd, Yd) and (Xr, Yr). The coordinates of the start point and end point of the sliding path are, respectively, (Xa, Ya) and (Xb, Yb). The length L of the actual sliding path equals to |Xa−Xb|, the first length L1=(2×|Xr−Xl|)/3, and the second length L2=|Xr−Xl|. The height H of the actual sliding path equals to |Ya−Yb|, the first height H1=0, and the second height H2=|Yu−Yd|.

Step 3: decide whether the length of the linear sliding path falls within the defined margin of error. If yes, step 4 would be taken; if no, users are reminded that the delete has failed.

Step 3 decides whether the length L of the sliding path is larger than or equal to the first length L1 and smaller than or equal to the second length L2 (L1≤L≤L2). L equals to |Xa−Xb|, an absolute value so to guarantee that it is positive. L1 equals to (2×|Xr−Xl|)/3 or larger than 0.

Step 4: decide whether the height of the linear sliding path falls within the defined maring of error. If yes, the sliding path is regarded as in line with the pre-defined deleting path; if no, users are reminded that the delete has failed Step 4 decides whether the height H of the actual sliding path is larger than or equal to the first height H1, and smaller than or equal to the second height H2 (H1≤H≤H2). H equals to |Ya−Yb|, an absoluate value so to guarantee that it is positive. H1 equals to 0 or equals to (1×|Yu−Yd|)/3.

In practice, step 3 and step 4 can make decisions without the need to follow a sequential order. As long as any one of the decisions show that a value does not fall within the margin of error, users are reminded that the delete has failed. Only when both decisions show that the values are within the margin of error, would the sliding path be regarded as in line with the pre-defined deleting path.

When the sliding path is decided as being in line with the deleting path, the message is deleted directly. Users can immediately delete spam messages when receiving a new message even if the screen is locked. The operation is easy and provides significant convenience to users.

If the sliding path is not in line with the deleting path, after the delete fails, a prompt box (showing that the delete fails) pops up and blinks for a pre-defined period of time (e.g. 2 seconds), and then closes automatically. The terminal continues to examine the users' operations on the screen. If it is still a sliding path, the terminal again decides whether the sliding path is in line with the pre-defined deleting path. If users choose to press the exit button, the message prompt box would be closed and previous operating interface would resume.

Figure 3:
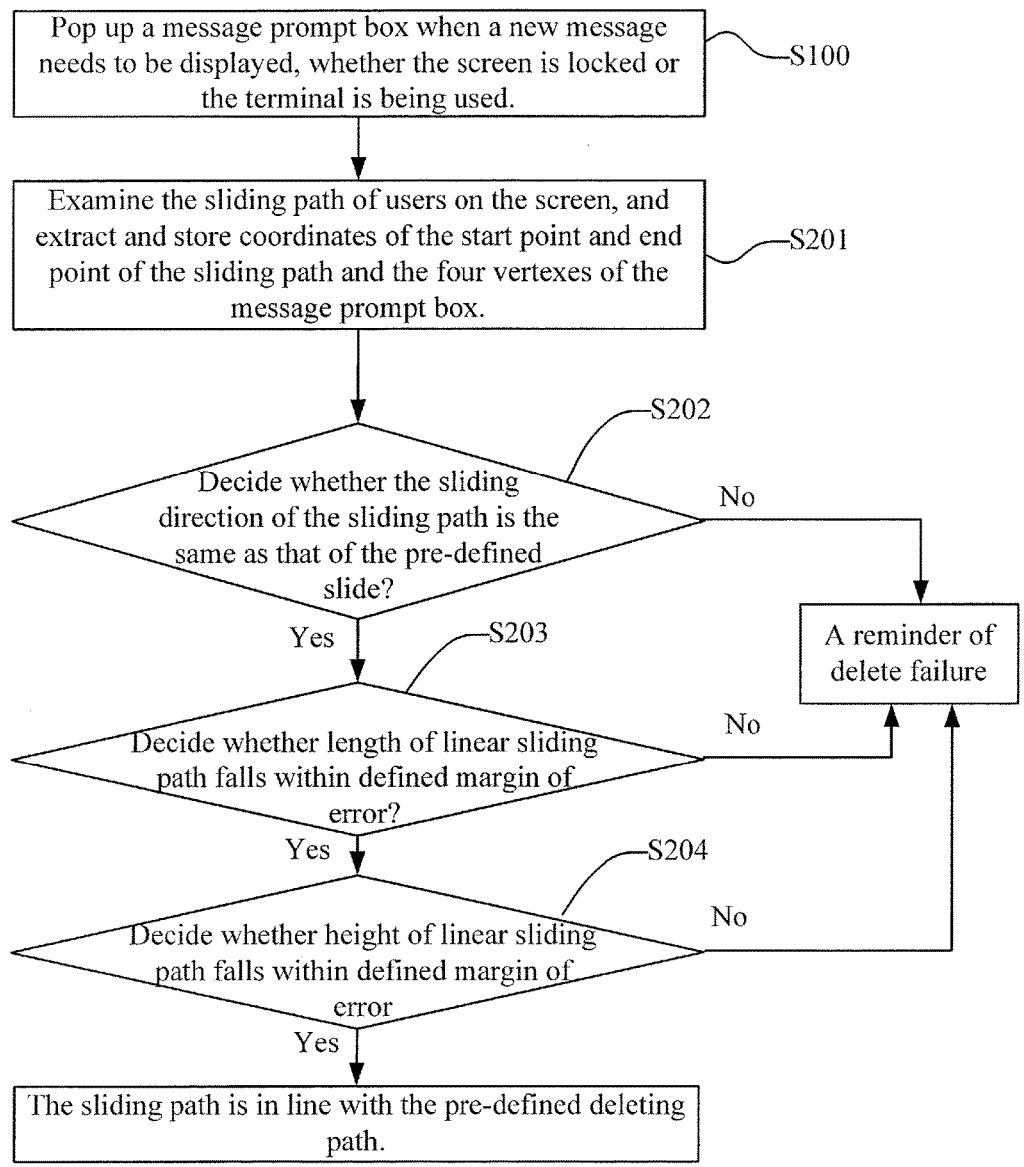
FIG. 3 shows a flowchart of steps associated with steps S100 and S200 illustrated in the method of deleting a message according to a preferred embodiment of the present invention.
Figure 4:
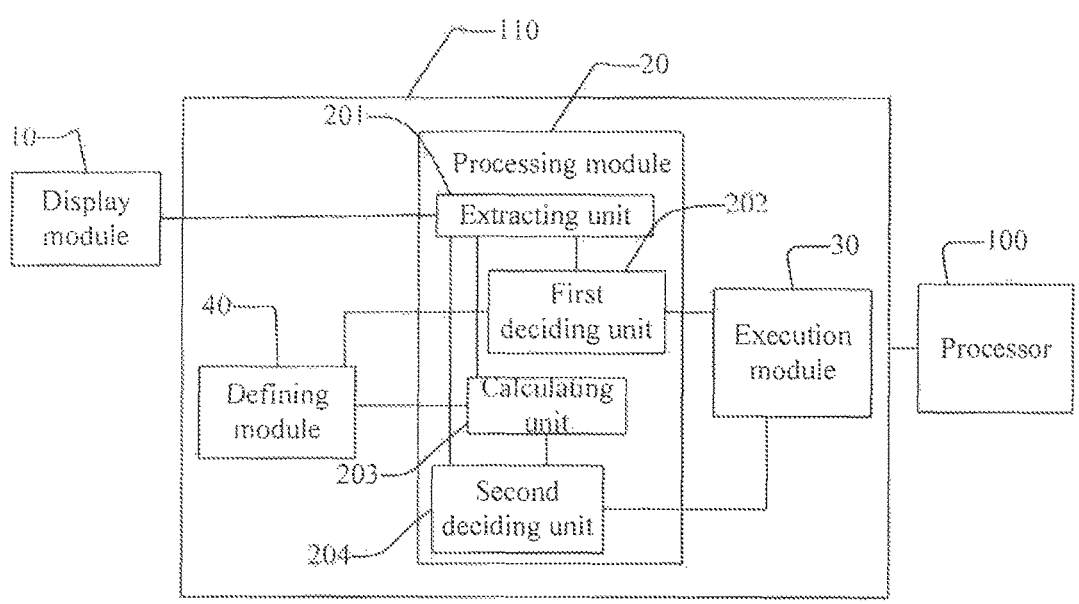
FIG. 4 shows a block diagram of a terminal according to a preferred embodiment of the present invention.

Based on the abovementioned method for deleting messages, the present invention further provides a corresponding terminal that realizes the method for deleting messages. Please refer to FIG. 3. The terminal comprises a display module 10, a processing module 20, and an execution module 30, linked by a sequential order. The display module 10 pops up a message prompt box when the terminal detects a new message must be displayed regardless whether the screen is locked or the terminal is being used. The processing module 20 decides whether the sliding path of users on the screen is in line with the pre-defined deleting path. The execution module 30 directly deletes the message when the sliding path is in line with the pre-defined deleting path.

In practice, a defining module 40 is further included. It records the sliding path of users on the screen, and maps the sliding path as a message deleting command. Namely, the defining module 40 defines the first length L1, second length L2, first height H1 and second height H2 of the margin of error based on the sliding path. The terminal comprises a memory 110 and a processor 100. The memory 110 is used for storing instructions. The processor 100 is coupled to the memory 110, and is used to execute the instructions stored inside the memory 110. The processing module 20, execution module 30, and defining module 40 are instructions executable by the processor 100 to perform corresponding functions.

The processing module 20 comprises:

an extracting unit 201 to extract and store coordinates of all the points on the sliding path;

a first deciding unit 202 to decide whether all the coordinates are within the message prompt box; if yes, then the sliding path is decided as in line with the pre-defined deleting path;

a calculating unit 203 to calculate the first length, second length, first height, second height, and the length and height of the actual sliding path;

a second deciding unit 204 to decide whether the direction of the sliding path is the same as that of the pre-defined slide based on abscissas of the start and end points. The result of this decision is used to decide whether the length and height of the sliding path fall within the defined margin of error.

The process of deleting messages of the terminal of the present embodiment is the same as the method for deleting messages in the previous embodiment. No further explanation is provided here.

To sum up, the present invention pre-defines a deleting path, and when the terminal detects a new message that must be displayed, a message prompt box pops up directly. The terminal decides whether the sliding path of users on the screen meets criteria to delete the message; if yes, the message is deleted directly. By doing so, users can immediately delete spam messages when a new message is received regardless whether the screen is locked or not. The operation is easy and provides significant convenience to users. It solves the problem with existing technology which cannot delete spam messages without first unlocking the screen or entering the message app menu.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method for deleting messages, comprising:
    step A: recording a sliding path of a user on a terminal and mapping the sliding path as a message deleting command;
    step B: defining a margin of error based on the sliding path;
    step C: popping up a message prompt box when a new message is detected and must be displayed, whether the screen is locked or the terminal is being used;
    step D: examining the sliding path of users on the screen and deciding whether it is in line with the pre-defined deleting path; and
    step E: deleting the message directly when the sliding path is in line with the pre-defined deleting path,
    wherein the shape of the sliding path comprises square, circle and line, which comprises straight lines, tilted lines and curved lines; defining the margin of error comprises defining the direction, length, and position on the screen of a linear sliding path, and the size and position on the screen of a square/circle sliding path,
    wherein the margin of error comprises a length L of the actual sliding path, with L meeting the criteria $L1 \leq L \leq L2$; a height H, with H meeting the criteria $H1 \leq H \leq H2$, where L1 is a first length, L2 is a second length, H1 is a first height and H2 is a second height.

2. The method of claim 1, wherein step D comprises:
    step D01: extracting and storing coordinates of all points on the sliding path and the four vertexes of the message prompt box;
    step D02: deciding whether coordinates of all points are within the message prompt box; confirming the sliding path is in line with the pre-defined deleting path if yes.

3. The method of claim 2, wherein the sliding path is a line and step D comprises:
    step D1: examining the sliding path of users on the screen, and extracting and storing coordinates of the start point and end point of the sliding path and the four vertexes of the message prompt box;
    step D2: deciding whether the sliding direction of the sliding path is the same as that of the pre-defined slide based on the abscissas of the start point and end point, and coordinates of the four vertexes of the message prompt box; step D3 is executed if yes; a reminder of delete failure is provided if no;
    step D3: deciding whether the length of the linear sliding path falls within the defined margin of error; step D4 is executed if yes; a reminder of delete failure is provided if no;
    step: D4: deciding whether the height of the linear sliding path falls within the defined margin of error; the sliding path is in line with the pre-defined deleting path if yes; a reminder of delete failure is provided if no.

4. The method for deleting messages of claim 3, wherein coordinates of the upper left corner, lower left corner, upper right corner, and lower right corner of the message prompt box are, respectively, (Xl, Yl), (Xu, Yu), (Xd, Yd) and (Xr, Yr); the coordinate of the start point of the sliding path is (Xa, Ya), and the coordinate of the end point of the sliding path is (Xb, Yb);
    steps before step D3 further comprises calculating the first length, second length, first height, second height, and length and height of the actual sliding path based on the coordinates of the four vertexes of the message prompt box, with the lengths, heights and coordinates meeting the following criteria:

$$L=|Xa-Xb|;$$

$$L1=(2\times|Xr-Xl|)/3;$$

$$L2=|Xr-Xl|;$$

$$H=|Ya-Yb|;$$

$$H1=0;$$

$$H2=|Yu-Yd|.$$

5. The method of claim 3, wherein the reminder of delete failure is a pop-up that blinks for a pre-defined period of time and then closes, and another sliding path on the screen or an operation to exit the message prompt box of users will be detected.

6. A method for deleting messages, comprising:
    step A01: recording a sliding path of a user on a terminal and mapping the sliding path as a message deleting command;
    step A02: defining a margin of error based on the sliding path;
    step A: popping up a message prompt box when a new message is detected and must be displayed, whether the screen is locked or the terminal is being used;
    step B: examining the sliding path of users on the screen and deciding whether it is in line with the pre-defined deleting path; and
    step C: deleting the message directly when the sliding path is in line with the pre-defined deleting path,
    wherein the shape of the sliding path comprises square, circle and line, which comprises straight lines, tilted lines and curved lines; defining the margin of error comprises defining the direction, length, and position on the screen of a linear sliding path, and the size and position on the screen of a square/circle sliding path,
    wherein the margin of error comprises a length L of the actual sliding path, with L meeting the criteria $L1 \leq L \leq L2$; a height H, with H meeting the criteria $H1 \leq H \leq H2$, where L1 is a first length, L2 is a second length, H1 is a first height and H2 is a second height.

7. The method of claim 6, wherein step B comprises:
  step B01: extracting and storing coordinates of all points on the sliding path and the four vertexes of the message prompt box;
  step B02: deciding whether coordinates of all points are within the message prompt box; confirming the sliding path is in line with the pre-defined deleting path if yes.

8. The method of claim 6, wherein the sliding path is a line and step B comprises:
  step B1: examining the sliding path of users on the screen, and extracting and storing coordinates of the start point and end point of the sliding path and the four vertexes of the message prompt box;
  step B2: deciding whether the sliding direction of the sliding path is the same as that of the pre-defined slide based on the abscissas of the start point and end point, and coordinates of the four vertexes of the message prompt box; step B3 is executed if yes; a reminder of delete failure is provided if no;
  step B3: deciding whether the length of the linear sliding path falls within the defined margin of error; step B4 is executed if yes; a reminder of delete failure is provided if no;
  step: B4: deciding whether the height of the linear sliding path falls within the defined margin of error; the sliding path is in line with the pre-defined deleting path if yes; a reminder of delete failure is provided if no.

9. The method of claim 8, wherein coordinates of the upper left corner, lower left corner, upper right corner, and lower right corner of the message prompt box are, respectively, (Xl, Yl), (Xu, Yu), (Xd, Yd) and (Xr, Yr); the coordinate of the start point of the sliding path is (Xa, Ya), and the coordinate of the end point of the sliding path is (Xb, Yb);
  steps before step D3 further comprises calculating the first length, second length, first height, second height, and length and height of the actual sliding path based on the coordinates of the four vertexes of the message prompt box, with the lengths, heights and coordinates meeting the following criteria:

$$L=|Xa-Xb|;$$

$$L1=(2\times|Xr-Xl|)/3;$$

$$L2=|Xr-Xl|;$$

$$H=|Ya-Yb|;$$

$$H1=0;$$

$$H2=|Yu-Yd|.$$

10. The method of claim 8, wherein the reminder of delete failure is a pop-up that blinks for a pre-defined period of time and then closes, and another sliding path on the screen or an operation to exit the message prompt box of users will be detected.

11. A terminal adopting the method for deleting messages as claimed in claim 6, comprising:
  a display module, to pop up a message prompt box when a new message is detected and must be displayed, whether the screen is locked or the terminal is being used;
  a processor;
  a memory connected with processor, the memory comprising a plurality of program instructions executable by the processor, the plurality of program instructions comprising:
    a processing module, configured to cause the processor to decide whether the sliding path of users on the screen is in line with the pre-defined deleting path;
    an execution module, configured to cause the processor to delete the message directly when the sliding path is in line with the pre-defined deleting path.

12. The terminal of claim 11, wherein the processing module comprises:
  an extracting unit, configured to cause the processor to extract and store coordinates of all points on the sliding path;
  a first deciding unit, configured to cause the processor to decide whether the coordinates are within the message prompt box; the sliding path is regarded as in line with the pre-defined deleting path if yes;
  a calculating unit, configured to cause the processor to calculate the first length, second length, first height, second height and the length and height of the actual sliding path based on the coordinates of the four vertexes of the message prompt box;
  a second deciding unit, configured to cause the processor to decide whether the direction of the sliding path is the same as that of the defined slide based on the abscissas of the start point and end point; and to decide, based on the first decision, whether the length and height of the sliding path fall within the defined margin of error.

* * * * *